United States Patent
Chung et al.

(10) Patent No.: US 10,666,119 B2
(45) Date of Patent: *May 26, 2020

(54) LAMINATE UNIT FOR MANUFACTURING BONDED-TYPE LAMINATED CORE MEMBER AND APPARATUS HAVING THE SAME FOR MANUFACTURING LAMINATED CORE MEMBER

(71) Applicant: POSCO TMC CO., LTD., Cheonan-si, Chungcheongnam-do (KR)

(72) Inventors: Il Gwen Chung, Seoul (KR); Suk Jo Kang, Asan-si (KR); Jae Young Lee, Suwon-si (KR); Chang Il Choi, Cheonan-si (KR)

(73) Assignee: POSCO TMC CO., LTD., Cheonan-si, Chungcheon (KR)

( * ) Notice: Subject to any disclaimer, the term of this patent is extended or adjusted under 35 U.S.C. 154(b) by 565 days.

This patent is subject to a terminal disclaimer.

(21) Appl. No.: 15/314,946

(22) PCT Filed: Mar. 31, 2015

(86) PCT No.: PCT/KR2015/003213
§ 371 (c)(1),
(2) Date: Nov. 30, 2016

(87) PCT Pub. No.: WO2016/006797
PCT Pub. Date: Jan. 14, 2016

(65) Prior Publication Data
US 2017/0201163 A1    Jul. 13, 2017

(30) Foreign Application Priority Data
Jul. 9, 2014    (KR) .......... 10-2014-0085894

(51) Int. Cl.
*H02K 15/02*    (2006.01)
*B32B 1/00*    (2006.01)
(Continued)

(52) U.S. Cl.
CPC ............... *H02K 15/02* (2013.01); *B32B 1/00* (2013.01); *B32B 7/12* (2013.01); *B32B 37/0046* (2013.01);
(Continued)

(58) Field of Classification Search
CPC .......... H02K 15/02; H02K 15/12; H02K 1/22; B32B 1/00; B32B 7/12; B32B 37/0046; B32B 37/12; B32B 38/0004
See application file for complete search history.

(56) References Cited

FOREIGN PATENT DOCUMENTS

| JP | H05-304037 A | 11/1993 |
|----|--------------|---------|
| JP | 3822020 B2   | 9/2006  |

(Continued)

OTHER PUBLICATIONS

International Search Report in International Application No. PCT/KR2015/003213, dated Jul. 15, 2015.

*Primary Examiner* — Livius R. Cazan
(74) *Attorney, Agent, or Firm* — Park, Kim & Suh, LLC

(57) ABSTRACT

Disclosed herein is a bonded-type laminated core member manufacturing apparatus including an adhesive application unit to apply an adhesive to a material being continuously transferred, and a laminating unit configured to integrate laminar members laminated within a laminating hole by blanking the material, a laminated core member being manufactured by interlayer adhesion between the laminar members, and the laminating unit includes an adhesive hardener to harden the adhesive located between the laminar members so as to integrate the laminar members passing through the laminating hole, and pinchers provided under (Continued)

the adhesive hardener to apply lateral pressure to the laminated core member so as to prevent falling of the laminated core member. Since the laminated core members may be stably extracted, damage to the laminated core member due to falling may be prevented and the laminated core members in an aligned state may be extracted.

15 Claims, 11 Drawing Sheets

(51) Int. Cl.
| | | |
|---|---|---|
| *B32B 7/12* | (2006.01) | |
| *B32B 37/00* | (2006.01) | |
| *B32B 37/12* | (2006.01) | |
| *B32B 38/00* | (2006.01) | |
| *H02K 1/22* | (2006.01) | |
| *H02K 15/12* | (2006.01) | |
| *H01F 3/02* | (2006.01) | |
| *H02K 1/12* | (2006.01) | |

(52) U.S. Cl.
CPC .......... *B32B 37/12* (2013.01); *B32B 38/0004* (2013.01); *H01F 3/02* (2013.01); *H02K 1/12* (2013.01); *H02K 1/22* (2013.01); *B32B 2311/00* (2013.01); *H02K 15/12* (2013.01)

(56) References Cited

FOREIGN PATENT DOCUMENTS

| | | | |
|---|---|---|---|
| JP | 2009-297758 A | | 12/2009 |
| JP | 2009297758 A | * | 12/2009 |
| JP | 2010-274625 A | | 12/2010 |
| JP | 2010274625 A | * | 12/2010 |
| JP | 5085746 B2 | | 11/2012 |
| KR | 10-1996-003021 A | | 1/1996 |
| KR | 10-2008-0067426 A | | 7/2008 |
| KR | 10-2008-0067428 A | | 7/2008 |

* cited by examiner (a)

(b)

(c)

(a)

(b)

(a)

(b)

LAMINATE UNIT FOR MANUFACTURING BONDED-TYPE LAMINATED CORE MEMBER AND APPARATUS HAVING THE SAME FOR MANUFACTURING LAMINATED CORE MEMBER

CROSS-REFERENCE TO RELATED APPLICATIONS

This application is the National Stage filing under 35 U.S.C. 371 of International Application No. PCT/KR2015/003213, filed on Mar. 31, 2015, which claims the benefit of Korean Patent Application No. 10-2014-0085894, filed on Jul. 9, 2014, the contents of which are all hereby incorporated by reference herein in their entirety.

TECHNICAL FIELD

The present invention relates to a core member manufacturing apparatus used to manufacture a core of a motor, a generator, etc. and, more particularly, to a bonded-type laminated core member manufacturing apparatus to manufacture a laminated core member for a motor by interlayer adhesion between laminar members, and a laminating unit to integrate a plurality of laminar members for manufacturing the bonded-type laminated core member.

BACKGROUND ART

In general, a laminated core manufactured by laminating and integrating laminar members is used as a rotor or a stator of a generator or a motor and, as methods of manufacturing laminated cores, i.e., by laminating the laminar members and then integrally fixing the laminar members, a tap fixing method using interlock taps, a fixing method using welding, for example, laser welding, a rivet fixing method, etc. have been known.

The tap fixing method is disclosed as manufacturing technology of a laminated core member in Patent Documents, i.e., Korean Patent Laid-open Publication Nos. 10-2008-0067426 and 10-2008-0067428. In manufacture of the laminated core member using such a method, iron loss occurs, particularly, it is difficult to execute embossing due to thickness reduction in a material, i.e., a steel sheet, and thus it is limited as technology for manufacturing laminated cores. The above-described Patent Documents and Patent Documents which will be described later disclose various kinds and shapes of laminated core members.

Recently, an adhesion fixing method, in which laminar members forming a laminated core member are adhered to each other by an adhesive so as to be integrated, has been proposed. Such an adhesion fixing method is disclosed in Korean Patent Laid-open Publication No. 10-1996-0003021 and Japanese Patent Laid-open Publication No. H5-304037.

With reference to Japanese Patent Laid-open Publication No. H5-304037 Among the above-described Patent Documents, a material for manufacturing a motor core, i.e., a steel sheet, is fed to a first press die and a second press die by a feed roller and, before the steel sheet is supplied to the first press die, an adhesive is applied to the surface of the steel sheet by an application roller and a nozzle.

Further, blanked members (laminar members) sequentially accumulated in the first press die and the second press die due to blanking of the material are integrated by the adhesive, thereby manufacturing an adhesive laminated core.

The above-described adhesion fixing methods, i.e., the adhesive laminated core manufacturing method, may reduce manufacturing costs, as compared to the laser welding method, and correspond to thickness reduction in the steel sheet, but, when the core strips are integrated within a laminating barrel by a heater and move downwards, the core strips fall to the bottom of the laminating barrel due to gravity and thus the laminated core member may be damaged due to falling weight thereof and/or damaged by another subsequently falling laminated core member and the laminated core members may be misaligned.

Further, the core strips passing through the heater and peripheral parts of the heater, for example, parts forming the dies and the laminating barrel, may be thermally deformed (thermally expanded) or damaged, misalignment of the core strips and a defective product may occur due to lowering (change) of straightness/accuracy of a region (the laminating barrel), through which a product, i.e., the core strips, passes, and product quality may not be uniformly maintained. Further, since elements, such as the press dies, the nozzles, the application roller, etc., are separately provided and independently operated, precise control in application of the adhesive and blanking of the material is required.

Further, in a conventional adhesive laminated core manufacturing apparatus, an outlet of a nozzle to apply an adhesive may cause leakage of the adhesive or pollution around the outlet, the adhesive leaked from the nozzle may be adhered to the surface of the nozzle and thus cause clogging of the outlet of the nozzle and pollution. These problems may disturb precise application of a fixed quantity of the adhesive and reduction in the hardening time.

Moreover, the conventional adhesive laminated core manufacturing apparatus has a difficulty in applying a regular amount of the adhesive to the surface of a steel sheet each designated cycle, and requires precise management of the adhesive supply pressure, i.e., the pressure of the adhesive within the nozzle, so as to accurately control the discharge quantity of the adhesive and the operation time of the nozzle (application timing of the adhesive), and, if an adhesive application process is not effectively executed, delamination of the laminated core occurs and causes a defective product and, thus, productivity may be lowered due to increase in a defect rate and management costs may be increased.

DISCLOSURE

Technical Problem

Therefore, the present invention has been made in view of the above problems, and it is an object of the present invention to provide a bended-type laminated core member manufacturing apparatus and a laminating unit which may prevent a laminated core member integrated within a laminating hole from being damaged due to falling thereof and maintain an alignment state of laminated core members passing through the laminating hole.

It is another object of the present invention to provide a bonded-type laminated core member manufacturing apparatus and a laminating unit which may guide stable extraction of laminated core members corresponding to thermal expansion of the laminated core members.

Technical Solution

In accordance with an aspect of the present invention, the above and other objects can be accomplished by the provision of a bonded-type laminated core member manufacturing apparatus including an adhesive application unit to apply an adhesive to a material being continuously transferred, and a laminating unit to integrate laminar members laminated within a laminating hole by blanking the material, a laminated core member being manufactured by interlayer adhesion between the laminar members, wherein the laminating unit includes an adhesive hardener configured to harden the adhesive located between the laminar members so as to integrate the laminar members passing through the laminating hole, and a pincher provided under the adhesive hardener to apply lateral pressure to the laminated core member so as to prevent falling of the laminated core member.

The pincher may include a plurality of pinching blocks movably provided under the adhesive hardener so as to pressurize the side surface of the laminated core member, and elastic members to elastically support the pinching blocks toward the inside of the laminating hole.

The pinching blocks are spaced apart from each other at the laminated hole.

The laminating unit may further include a blocking material provided between the adhesive hardener and the pincher so as to thermally insulate the adhesive hardener and the pincher from each other.

The laminating unit may further include a squeezer to apply lateral pressure to squeeze the laminar members moving to the adhesive hardener so as to align the laminar members sequentially laminated within the laminating hole by blanking the material.

The laminating unit may further include a blocking material provided between the adhesive hardener and the squeezer so as to thermally insulate the adhesive hardener and the squeezer from each other. The laminating unit may further include cooling paths provided around the adhesive hardener.

Blanking of the material is executed by a blanking unit provided above the laminating unit. The blanking unit includes a blank punch provided on an upper press die of the bonded-type laminated core member manufacturing apparatus, and a blank die provided on a lower press die of the bonded-type laminated core member manufacturing apparatus, together with the adhesive hardener, so as to be opposite the blank punch. The adhesive application unit may include adhesive applicator provided on the lower press die, together with the blank die. And, a pressure member to pressurize the material toward the adhesive applicator is provided on the upper press die, and the adhesive applicator is provided at an upstream region in the transfer direction of the material, as compared to the blank die.

In accordance with another aspect of the present invention, there is provided a laminating unit for manufacturing a bonded-type laminated core member, integrating laminar members laminated in the vertical direction within a laminating hole so as to manufacture a core of a motor or a generator, the laminating unit comprising an adhesive hardener to harden an adhesive located between the laminar members so as to integrate the laminar members passing through the laminating hole, and a pincher provided under the adhesive hardener to apply lateral pressure to a laminated core member so as to prevent falling of the laminated core member.

Advantageous Effects

A bonded-type laminated core member manufacturing apparatus and an adhesive application unit in accordance with the present invention have effects, as below.

First, in accordance with one embodiment of the present invention, laminated core members may be stably extracted and, thus, falling of products due to release of lateral pressure and damage to the laminated core members due to falling impact may be prevented and the laminated core members in an aligned state may be extracted.

Second, in accordance with the embodiment of the present invention, even if the size of the laminated core members is changed due to thermal expansion, lateral pressure may be stably applied to the side surfaces of the laminated core members and, thus, gradual movement of the laminated core members within a laminating hole may be guided.

Third, in accordance with the embodiment of the present invention, accuracy of a laminating unit, which integrates laminar members, i.e., straightness of the laminating hole through which the laminar members pass, is stably maintained and, thus, misalignment of the laminated core members is prevented and management of product quality is facilitated.

Fourth, in accordance with the embodiment of the present invention, heating/thermal expansion of other peripheral units, for example, press dies, a squeezer, pinchers and other parts, except for objects to be heated may be reduced, and the laminar members may be laminated in an aligned state, straight mobility of the laminar members may be improved.

Fifth, in accordance with the embodiment of the present invention, contamination of an adhesive outlet (a nozzle outlet) or a region around the outlet by the adhesive may be minimized or prevented, the application area, application amount, and application positions of the adhesive may be uniformly managed, and the consumption amount of the adhesive may be reduced. In more detail, since the adhesive outlet is opened only when a material approaches an adhesive application unit, the discharge time and the application amount of the adhesive may be regularly controlled.

Sixth, in accordance with the embodiment of the present invention, clogging of the adhesive outlet and a passage (channel) by hardening and adhesion of the adhesive may be prevented and an error in interlayer adhesion of the laminated core member may be prevented.

Seventh, in accordance with the embodiment of the present invention, since a blanking punch to blank a metal strip and a pressure member to press the metal strip toward the adhesive applicator are mounted on an upper press die and thus simultaneously elevated, a blanking process and an adhesive application process corresponding to pre-process of the blanking process may be simultaneously executed by synchronization of the blanking punch and the pressure member, adhesive application timing may be stably and accurately maintained, and the laminar members may be sequentially laminated by blanking so that lamination and alignment of the laminar members may be facilitated.

DESCRIPTION OF DRAWINGS

The above and other objects, features and other advantages of the present invention will be more clearly understood from the following detailed description taken in conjunction with the accompanying drawings, in which.

BEST MODE

Figure 1:
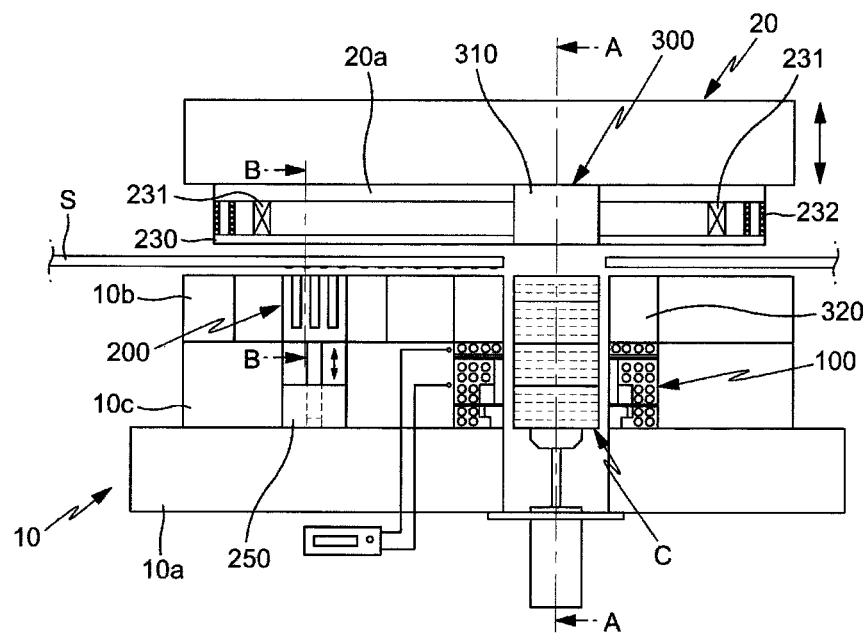
FIG. 1 is a longitudinal-sectional view schematically illustrating a bonded-type laminated core member manufacturing apparatus in accordance with one embodiment of the present invention, taken in the transfer direction of a material.

Hereinafter, embodiments of the present invention will be described in detail with reference to the accompanying drawings. In description of the embodiments of the invention, the same or similar elements are denoted by the same reference numerals even though they are depicted in different drawings.

The present invention relates to a bonded-type laminated core member manufacturing apparatus which manufactures a laminated core member for motor cores by forming laminar members having a designated shape by blanking a strip-type material, which is continuously transferred, and executing interlayer adhesion between the laminar members, and a laminating unit which hardens the adhesive interposed between the laminar members so as to integrate the laminar members.

That is, one embodiment of the present invention relates to a laminating unit which forms a laminated core member by integrating laminar members stacked by blanking a material, and a bonded-type laminated core member manufacturing apparatus including the laminating unit and an adhesive application unit.

First, with reference to FIGS. 1 to 5, a laminating unit for manufacturing a bonded-type laminated core member and a bonded-type laminated core member manufacturing apparatus having the same in accordance with one embodiment of the present invention will be described.

Figure 2:
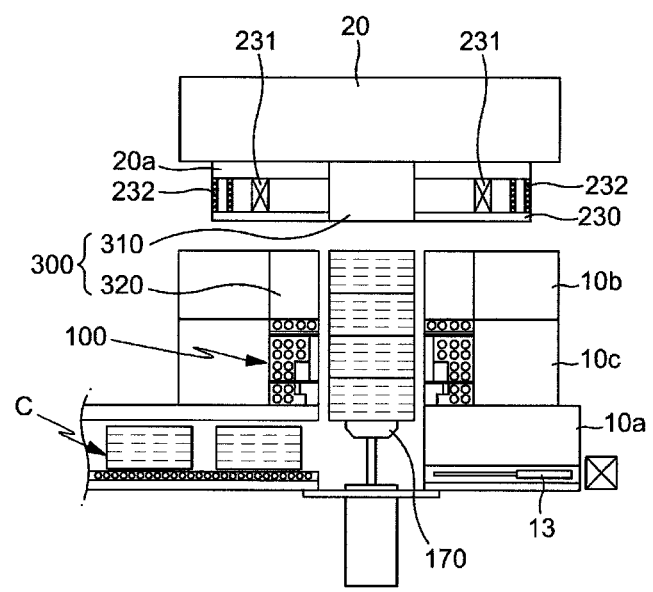
FIG. 2 is a longitudinal-sectional view illustrating a laminating unit in accordance with one embodiment of the present invention, taken along line A-A of FIG. 1.
Figure 3:
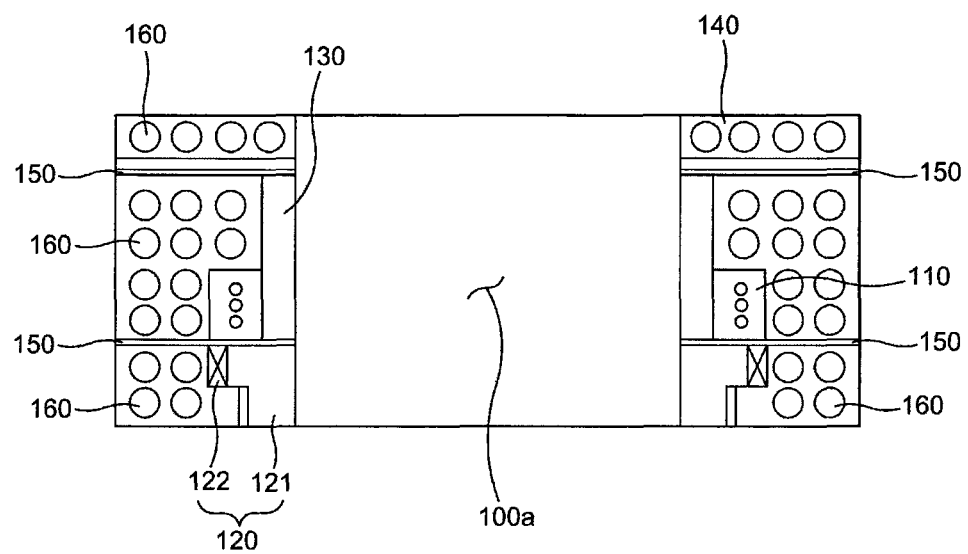
FIG. 3 is a cross-sectional view illustrating a laminating unit in accordance with one embodiment of the present invention.
Figure 4:
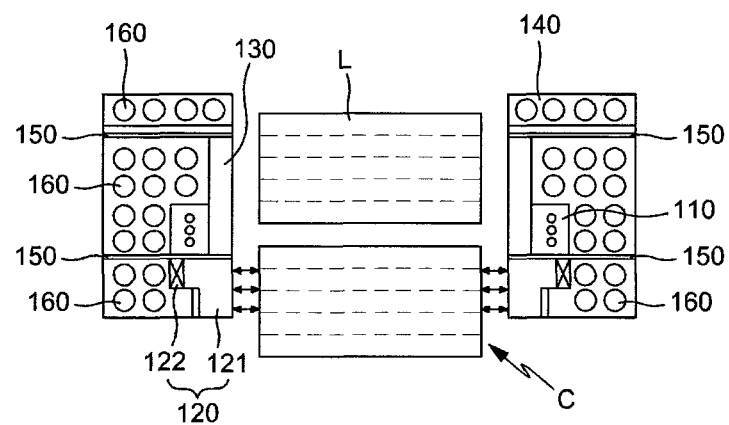
FIG. 4 is a cross-sectional view illustrating a process of integrating laminar members in (within a laminating hole of) the laminating unit shown in FIG. 3.

FIG. 1 is a longitudinal-sectional view schematically illustrating a bonded-type laminated core member manufacturing apparatus in accordance with one embodiment of the present invention, taken in the transfer direction of a material, FIG. 2 is a longitudinal-sectional view illustrating a laminating unit in accordance with one embodiment of the present invention, taken along line A-A of FIG. 1, FIG. 3 is a cross-sectional view illustrating a laminating unit in accordance with one embodiment of the present invention, FIG. 4 is a cross-sectional view illustrating a process of integrating laminar members in (within a laminating hole of) the laminating unit shown in FIG. 3, and FIGS. 5(a) to 5(c) are plan views illustrating various examples of core members.

With reference to FIGS. 1 to 5, a bonded-type laminated core member manufacturing apparatus in accordance with this embodiment includes a laminating unit 100 to integrate laminar members L, and an adhesive application unit 200 to apply an adhesive to a material S which is continuously transferred.

The laminating unit 100 integrates the laminar members L, sequentially formed of the continuously transferred material S, for example, a steel sheet for manufacturing a motor core (hereinafter, referred to as a "metal strip"), by a blanking unit 300 and, more particularly, integrates the laminar members L in a designated number into one body by hardening the adhesive interposed between the laminar members L.

In more detail, the laminating unit 100 includes an adhesive hardener 110 to harden the adhesive interposed between the laminar members L continuously passing through a laminating hole 100a, and pincher 120 provided under the adhesive hardener 110 so as to pinch the laminated core member C. The laminating hole 100a is a space in which the laminar members L are laminated in the vertical direction and continuously move so as to be integrated and, in this embodiment, the laminating hole 100 is formed through the laminating unit 100 in the vertical direction.

The adhesive hardener 110 is a device which hardens the adhesive interposed between the laminar members L and, in this embodiment, the adhesive hardener 110 is a high-frequency induction heater which hardens the adhesive using high-frequency induction heating so as to increase the hardening speed of the adhesive and thus integrates objects to be heated, i.e., the laminar members L. High-frequency induction heating is well known in the art and a detailed description thereof will thus be omitted. In the present invention, high-frequency induction heating will be disclosed as a method which effectively hardens the adhesive applied between the laminar members L and minimizes thermal influence on peripheral parts.

A guide 130 to guide movement of the laminar members L is provided within the adhesive hardener 110. The guide 130 may be formed of a nonconductive material, in more detail, engineering ceramics, so as not to be influenced by high-frequency induction heating.

The pincher 120 prevents a product discharged downward from the adhesive hardener 110, i.e., the laminated core member C formed by integrating the laminar members L, from rapidly falling. For this purpose, the pincher 120 is provided under the adhesive hardener 110, and provides lateral pressure to the laminated core member C so as to prevent the laminated core member from momentarily falling.

Further, the laminating unit 100 further includes a squeezer 140 to apply pressure (lateral pressure) to the side surfaces of the laminar members L moving downward toward the adhesive hardener 110 from the upper side of the adhesive hardener 110 so as to squeeze the laminar members L, i.e., a squeezer 140 for alignment.

The squeezer 140 applies lateral pressure to the laminar members L so that the laminar members L sequentially formed by blanking the metal strip S are aligned so as to be laminated within the squeezer 140. As the laminar members L sequentially enter the squeezer 140, the laminar members L are shrink-fitted into the squeezer 140.

In this embodiment, the squeezer 140 is located above the adhesive hardener 110 and aligns the laminar members L in a straight line, and the laminar members L are laminated in the aligned state by the squeezer 140 and enter the high-frequency heater 110 via the squeezer 140. The squeezer 140 may be made of special steel, for example, SKD-11.

The blanking unit 300 includes a blank punch 310 and a blank die 320, and sequentially forms laminar members L having a designated shape by blanking the metal strip S continuously passing through a space between the blank punch 310 and the blank die 320.

Figure 5:
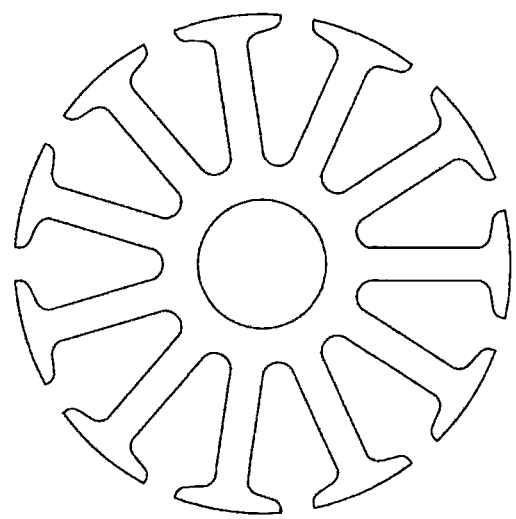
FIG. 5 shows are plan views illustrating various examples of core members.
Figure 5:
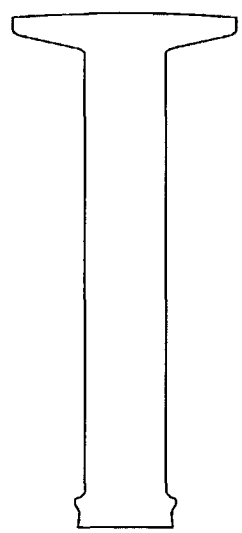
Figure 5:
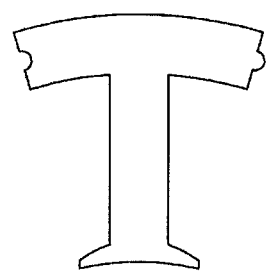

In this embodiment, the laminar member L refers to a thin monolayer sheet manufactured by blanking the material, i.e., the metal strip S. Further, the laminated core member C is a structure for forming a stator or a rotor of a motor and may be a member for forming at least one part of a core, for example, a core wing on which a coil is wound. FIG. 5 shows plan views illustrating various examples of bonded-type laminated core members. With reference to FIG. 5, bonded-type laminated core members may be manufactured so as to have various outline shapes according to core manufacture and design conditions.

The blank die 320 has a die hole having a designated shape opposite the blank punch 310, and the laminar members L are input to the inner hole of the blank die 320, i.e., the die hole, simultaneously with blanking. Although FIG. 1 illustrates that a blanking region of the metal strip S (a part of the metal strip S cut by blanking) has a greater area than that of the laminar member L, it is apparent to those skilled in the art that the blanking region and the laminar members L have the substantially same size and shape, and the laminar members L having the same size and shape as the blank die 320, i.e., the die hole, are formed.

In this embodiment, the blank punch 310 is provided on an upper press die 20, more particularly on an upper frame 20*a*, and the blank die 320 is provided on a lower press die 10, more particularly on a die frame 10*b*. Further, in order to execute a blanking process subsequent to an adhesive application process, the blanking unit 300 is located downstream in the transfer direction of the metal strip S, as compared to the adhesive application unit 200.

Further, the blank punch 310 and a pressure member 230 to pressurize the metal strip S toward the lower press die 10 are provided on the upper frame 20*a* and are elevated and lowered integrally with the upper press die 20. Therefore, when the blanking process by the blanking unit 300 is executed on the metal strip S, the adhesive application process by the adhesive application unit 200 is executed at an upstream portion of the metal strip S, spaced apart from the blanking unit 300 by a designated pitch, simultaneously with the blanking process.

As described above, the blanking unit 300 blanks the metal strip S, the laminating unit 100 integrates the laminar members S sequentially manufactured by blanking, and the above-described laminating hole 100*a* to pass the sequentially stacked laminar members L so as to integrate the laminar members L is provided under the blank die 320.

In more detail, the squeezer 140, which is provided under the blank die 320, aligns the laminar members L passing through the squeezer 140 in the downward direction toward the adhesive hardener 110, and the adhesive hardener 110, which is provided under the squeezer 140, integrates the laminar members L by hardening the adhesive interposed between the laminar members L.

The squeezer 140 supports the side surfaces of the laminar members L and prevents a laminating error, i.e., an alignment error, of the laminar members L so as to sequentially stack the laminar members L, and may include a squeezer ring which has the same shape of the inside of the blank die 320, i.e., the die hole, for example, thoroughly surrounds the circumferences of the laminar members L. Therefore, if the laminar members L have a circular outer surface, the inner hole of the squeezer ring has a circular shape and, if the laminar members L have a T shape, the inner hole of the squeezer ring has a T shape.

The squeezer 140 may be formed in a ring type or a barrel type surrounding the outer surfaces of the laminar members L, or may have a structure including pins or blocks which are located at a plurality of positions so as to divisionally support the outer surfaces of the laminar members L. Further, the laminar members L in the shrink-fit state into the squeezer 140 are pushed by the blank punch 310 and thus pass through the squeezer 140 by 1 pitch (the thickness of a single laminar member L) per press stroke, and a hole formed in the squeezer 140, i.e., a squeezer hole, may become a part of the laminating hole 100*a*.

In this embodiment, the above-described guide 130 is provided within the adhesive hardener 110. The guide 130 guides alignment of objects to be heated, located within the adhesive hardener 110, i.e., the high-frequency heater, and straight passing of the objects to be heated (straight extraction of a product) and the guide 130 employs a guide formed of a nonconductive material, for example, engineering ceramics, as described above.

A blocking material 150 for thermal insulation between the squeezer 140 and the adhesive hardener 110 may be provided on the adhesive hardener 110. The blocking material 150 thermally insulate the squeezer 140 and the adhesive hardener 110 from each other and thus minimizes or prevents heating of other peripheral parts, particularly, the squeezer 140, by high-frequency induction heating except for the inner region of the adhesive hardener 110 (an adhesive hardening region), through which the laminar members L pass. For example, as the blocking material, a shielding material formed of beryllium copper may be used.

Further, as exemplarily shown in FIG. 3, cooling paths 160, for example, cooling water paths, to cool the lower press die 10, particularly a die holder 10*c*, may be provided around the adhesive hardener 110, and cooling paths 160 may be provided at the squeezer 140. The adhesive hardener 110 is disposed within a cooling block having the cooling paths 160, and the outer surface of the adhesive hardener 110 is surrounded by the cooling block.

The pincher 120 applies lateral pressure to a product (a laminated and hardened core member) C passing through inner space of the pincher 120 and thus assists alignment of the product C moving downward from the adhesive hardener 110 and prevents the product C, i.e., the core member, from suddenly or rapidly falling.

The pincher 120 includes a pinching block 121 and a pinching spring 122 which is an elastic member to elastically support the pinching block 121, and the pincher 120 pinches the side surface of a product discharged from the adhesive hardener 110, i.e., the core member C, and prevent the core member C from rapidly falling to the bottom of the laminating hole 100*a* after passing through the adhesive hardener 110.

Further, the above described blocking material 150 may be provided between the adhesive hardener 110 and the pinchers 120, and the cooling paths 160 may be provided around pinchers 120, i.e., at the circumference of the pinchers 120.

The blank die 320, the squeezer 140, the guide 130 and the pincher 120 are disposed coaxially on the lower press die 10 so that each thereof forms a part of the above-described laminating hole 100*a*, and an extraction support 170 to support the lower surface of a product (the laminated core member C) extracted through the lamination and hardening processes is provided on the bottom of the laminating hole 100*a* so as to be elevatable.

The extraction support 170, in a state in which the core members C are seated on the extraction support 170, is lowered and, when the extraction support 170 reaches the bottom of the laminating hole 100*a* (laminating barrel), an extraction cylinder 13 pushes the core member C to an extraction passage and thus assists extraction of the product.

Although FIG. 4 illustrates an interval between the lower core member C and another core member C provided thereon, the core members C are actually directly stacked so as to contact each other and thus continuously pass through the laminating hole 100*a*. Further, the side surfaces of the laminar members L and the side surfaces of the laminated core members C closely contact the inner surface of the laminating hole 100*a*, more particularly, the inner surfaces of the squeezer 140 and the pinchers 120.

Figure 6:
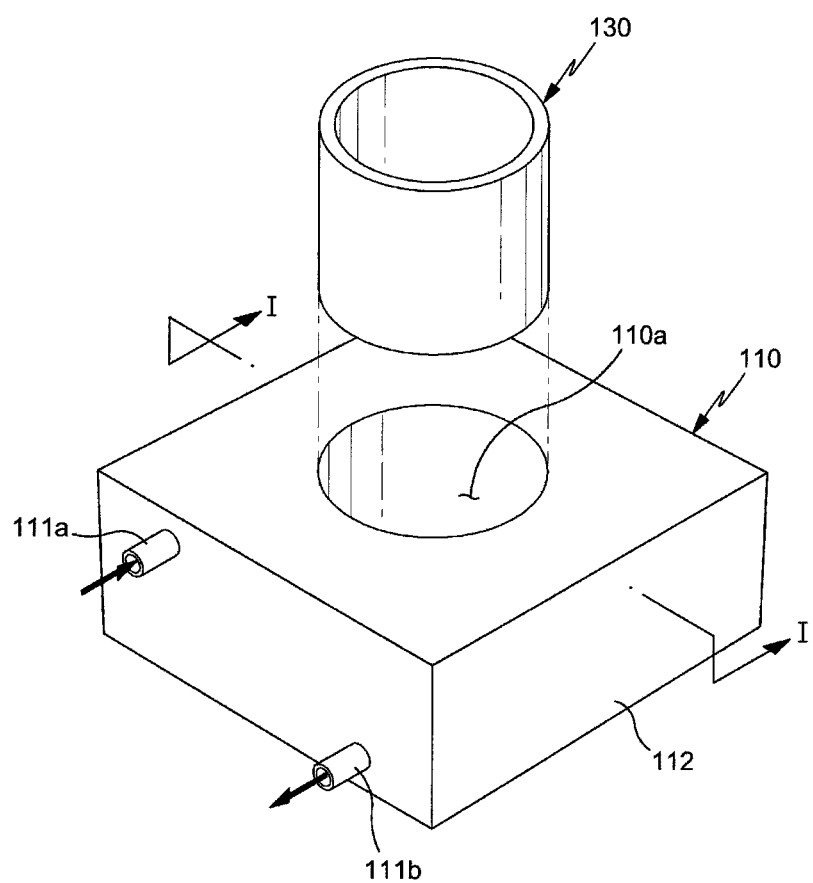
FIG. 6 is an exploded perspective view illustrating a high-frequency heater and a guide of a laminating unit in accordance with one embodiment of the present invention.
Figure 7:
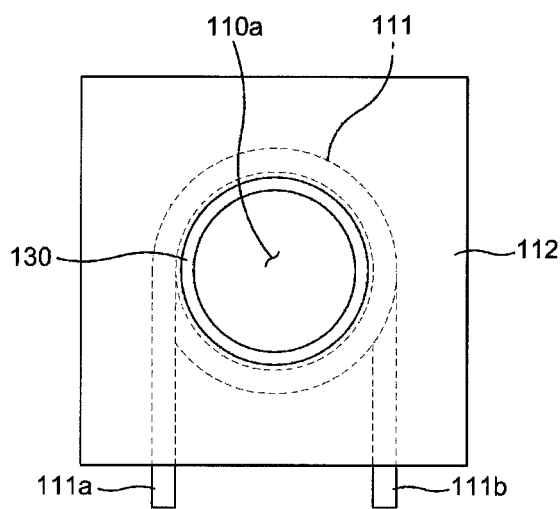
FIG. 7 is a plan view illustrating an assembled state of the high-frequency heater and the guide shown in FIG. 6.
Figure 8:
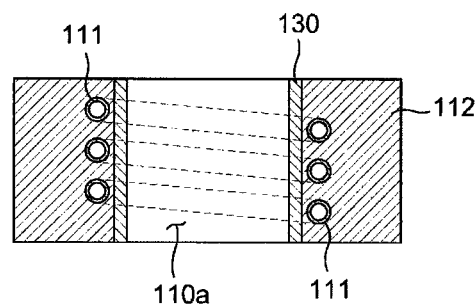
FIG. 8 is a cross-sectional view of FIG. 6.

With reference to FIGS. 6 to 8, the adhesive hardener 110, i.e., high-frequency heater, includes a coil 111 forming a passage of high-frequency current, and the coil 111 is wound on the circumference of a hardening hole 110*a*, which accommodates the laminar members L. In more detail, the coil 111 has a coil pipe buried in a spiral shape in a coil block 112, and terminals 111*a* and 111*b* to apply high-frequency current are provided at both ends of the coil pipe so as to be exposed to the outside of the coil block 112.

The above-described hardening hole 110*a* is formed through the coil block 112 in the vertical direction, and a cooling fluid, for example, cooling water, is supplied to/discharged from the coil 111, i.e., the coil pipe, as exemplarily shown by arrows of FIG. 6. Further, the above-described guide 130 is disposed in the hardening hole 110*a*.

The guide 130 may have a vacant integral structure such as a ring or a barrel, or split structure. The guide shown in FIG. 6 has a vacant cylindrical block structure, which is applicable if the laminar member L has a circular outer surface, for example, has the shape shown in FIG. 5(*a*). If the laminar member L has a T shape, as exemplarily shown in FIG. 5(B), the inner hole of the guide 130, i.e., a guide hole, may have a T shape.

In consideration of thermal expansion of objects to be heated and the guide 130, the guide 130 may have a smaller size than the hardening hole 110*a* so that a gap is formed between the inner circumferential surface of the hardening hole 110*a* and the outer circumferential surface of the guide 130.

Figure 9:
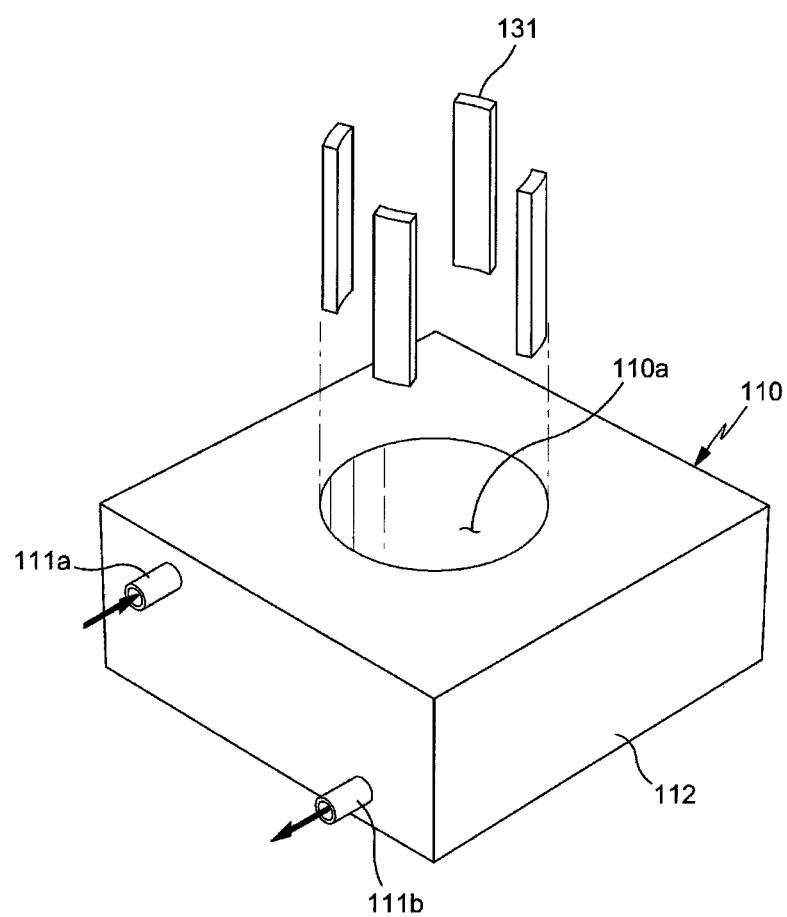
FIG. 9 is an exploded perspective view illustrating a high-frequency heater and a guide of a laminating unit in accordance with another embodiment of the present invention.

Of course, as exemplarily shown in FIG. 9, the guide 130 may include a plurality of guide pins 131 divided from each other in the circumferential direction of the inner profile, for example, the inner circumferential surface, of the hardening hole 110*a*.

Figure 10:
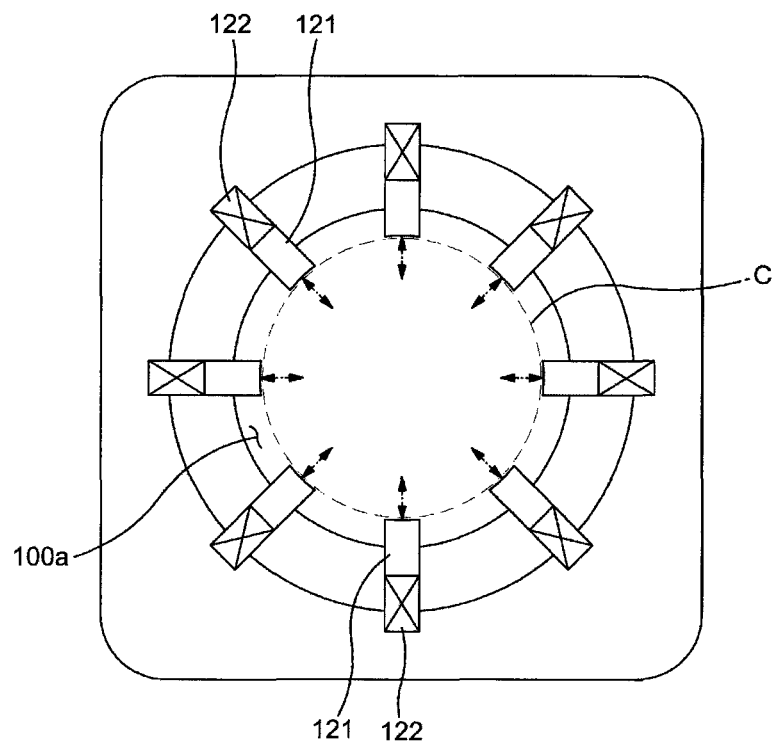
FIG. 10 is a plan view schematically illustrating pinchers applicable to a laminating unit in accordance with one embodiment of the present invention.

With reference to FIG. 10, a plurality of pinching blocks 121 are spaced apart from each other along the circumference of the laminated core member C within the laminating hole 100*a*, for example, are installed at designated angles within the laminating hole 100*a*. Although the pincher 120 may be formed as a moving type or a fixed type, the moving type pincher 120 is preferable in consideration of thermal expansion. If, the pinching springs 122 are omitted in FIG. 10 and the pinching blocks 121 are fixed in place, fixed-type pincher 120 may be formed.

The pinching blocks 121 are disposed at a plurality of positions spaced apart from each other along the circumference of the core member C and supported by elastic members, i.e., the pinching springs 122, thus applying elastic lateral pressure to the core member C. Therefore, the pincher 120 in accordance with this embodiment is moving-type pincher. If pinching blocks are fixed within the laminating hole 100*a* without position change, fixed-type pincher may be formed. Of course, the squeezer 140 is not formed in the above-described fixed type, for example, a ring structure, and may be formed in a moving type in the same manner as the pincher 120.

Hereinafter, an adhesive application unit applicable to a core member manufacturing apparatus in accordance with one embodiment of the present invention will be described with reference to FIGS. 11 to 13. However, the adhesive application unit applicable to the present invention is not limited to a structure that will be described below.

Figure 11:
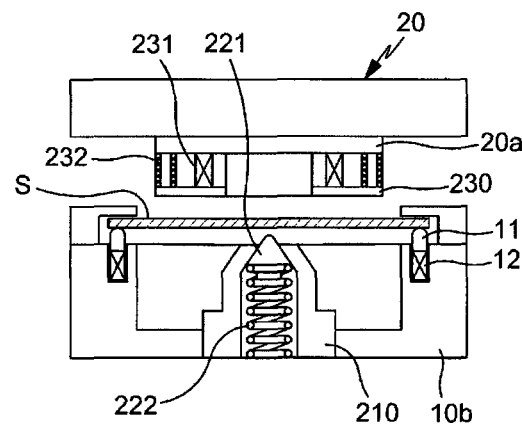
FIG. 11 is a longitudinal-sectional view taken along line B-B of FIG. 1.
Figure 12:
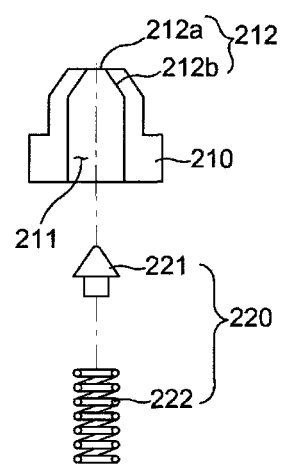
FIG. 12 is an exploded sectional view illustrating an adhesive applicator and a valve of the adhesive application unit shown in FIG. 11.
Figure 13:
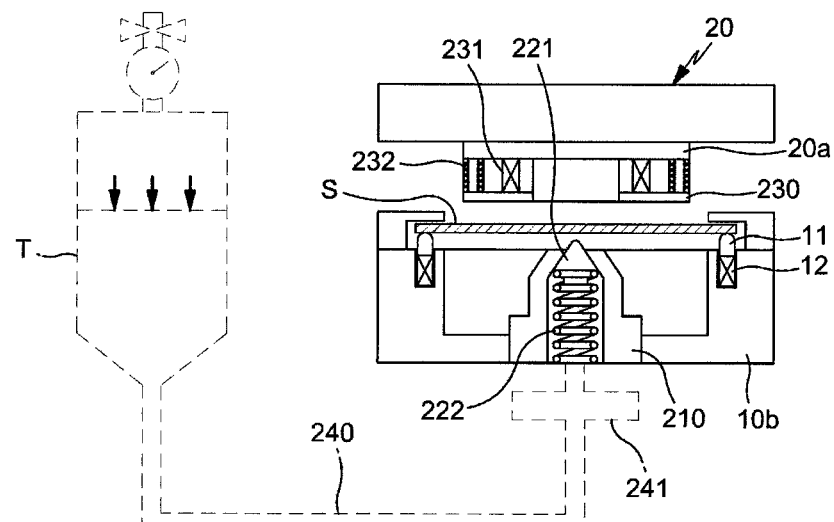
FIG. 13 shows longitudinal-sectional views illustrating operation of the adhesive application unit shown in FIG. 11.
Figure 13:
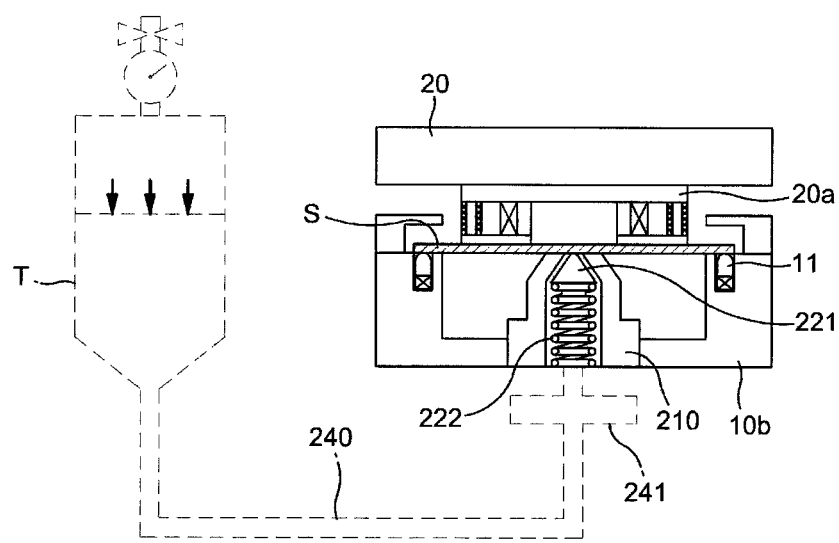

With reference to FIGS. 11 to 13, the adhesive application unit 200 applies an adhesive to a metal strip S at a designated position per designated timing. In this embodiment, when the metal strip S and the adhesive application unit 200 come close to each other, application of the adhesive to the metal strip S is executed.

In more detail, the adhesive application unit 200 is selectively opened at a regular position so as to apply the adhesive to the metal strip S. Further, the blanking unit 300 sequentially forms the laminar members having a designated shape by blanking the metal strip S, for example, electrical steel, as described above. In this embodiment, the adhesive application unit 200 is provided upstream in the transfer direction of the metal strip S, as compared to the blanking unit 300, and executes the adhesive application process prior to the blanking process. The laminar members L formed by the blanking unit 300 are sequentially laminated and integrated by the laminating unit 100 and are then discharged.

The adhesive application unit 200 includes an adhesive applicator 210 which is selectively opened to apply the adhesive at a designated position per designated timing, i.e., each designated cycle, to apply the adhesive to the surface of the metal strip S, for example, the lower surface of the metal strip S, and a valve 220 to open and close an outlet of the adhesive applicator 210 to apply the adhesive.

In this embodiment, the adhesive application unit 200 is a nozzle type which is pressed by the metal strip S and is thus opened to transfer the adhesive to the surface of the metal strip S in a dot pattern. In more detail, the adhesive applicator 210 corresponding to a nozzle body includes a nozzle path 211 charged with the adhesive and an outlet channel 212 forming the outlet of the adhesive applicator 210.

Here, the adhesive applicator 210 corresponds to a nozzle body (hereinafter, denoted by the same reference numeral as "the adhesive applicator"), and the outlet channel 212 corresponds to a nozzle outlet formed to face the metal strip S so as to form the outlet of the nozzle path 211. When the valve 220 is opened, the adhesive of a designated pressure received in an adhesive reception room 241 (with reference to FIG. 13) is applied to the surface of the metal strip S through the outlet channel 212.

Further, the valve 220 closes the outlet channel 212 and then opens the outlet channel 212, i.e., the nozzle outlet, when the metal strip S and the outlet channel 212 come close to each other. That is, the valve 210 opens the nozzle outlet (hereinafter, denoted by the same reference numeral as "the outlet channel") only at the adhesive application timing.

The valve 220 includes a valve plug 221 which is movably inserted into the outlet channel 212 and thus opens and closes the outlet channel 212. In this embodiment, the valve plug 221 is pressed by the metal strip S and thus opens the outlet channel 212. Then, when external force applied to the valve plug 221 by the metal strip S is removed, the valve plug 221 is moved to a blocking position of the outlet channel 212, the front end of the valve plug 221 protrudes outward from the outlet channel 212, i.e., the nozzle outlet, and, consequently, the outlet channel 212 is closed.

In this embodiment, the metal strip S is pressed by the pressure member 230 and thus descends and, when the metal strip S comes close to the nozzle body 210 and the front end of the valve plug 221 is pressed by the metal strip S, the valve plug 221 moves backward (descends) to the inside of the nozzle body 210 and thus opens the nozzle outlet 212.

And, when the metal strip S ascends and becomes distant from the nozzle body 210, the valve plug 221 returns to an original position thereof, i.e., moves forward (ascends) and closes again the nozzle outlet 212. The valve plug 221 closes the nozzle outlet 212 by the pressure of a fluid within the nozzle body 210 and/or a valve supporter 222 which returns the valve plug 221 to the nozzle blocking position.

The valve supporter 222 may include a spring which elastically supports the valve plug 221, for example, a coil spring. One end (the lower end) of the coil spring is installed on the bottom of the nozzle body 210 and the other end (the upper end) of the coil spring is connected to the valve plug 221 so as to provide elastic force in the direction of the nozzle outlet to the valve plug 221.

With reference to FIGS. 11 and 12, the outlet channel 212 includes an outlet 212a to discharge the adhesive and a passage reduction part 212b gradually narrowed in the direction of the outlet 212a. Further, the valve plug 221 may have a shape, the width of which is gradually decreased in the forward direction (upward direction), so as to correspond to (match) the shape of the outlet channel 212. For example, the upper structure of the valve plug 221 may have a conical shape or a polygonal pyramid shape.

Further, in the present embodiment, the nozzle body 210 is provided in the lower frame (lower press die) 10, particularly, the die frame 10b. Lifters elastically supporting the metal strip S in the upward direction to return the metal strip S to a top dead center are provided on the die frame 10b. With reference to FIG. 11, the lifter in accordance with this embodiment includes a lift pin 11 to support the metal strip S and a lift spring 12 to support the lift pin 11 in the upward direction. The lifters elastically support the metal strip S in the upward direction and thus space the metal strip S apart from the adhesive applicator 210, i.e., the valve plug 221.

Therefore, when the pressure member 230 ascends, the metal strip S becomes distant from the nozzle body 210 and, when force pressing the valve plug 221 in the downward direction is removed, the valve plug 221 returns to the nozzle blocking position thereof by the pressure of the inside of the nozzle (the pressure of the inside of the adhesive reception room) and/or the valve supporter 222.

With reference to FIG. 13, the nozzle body, i.e., the adhesive applicator, 210 receives the adhesive through an adhesive supply pipe 240 of an adhesive supplier. In more detail, the adhesive received in an adhesive tank T is supplied at a designated pressure to the nozzle body 210 through the adhesive supply pipe 240 by a pneumatic device applying air pressure or other pumps.

That is, the adhesive supplier includes the adhesive tank T and an adhesive pressurizer to apply pressure to the adhesive received in the adhesive tank T, such as a pneumatic device, a hydraulic device or other pumps, and the adhesive is supplied to the nozzle body 210 via the adhesive supply pipe 240 and the adhesive reception room 241.

Figure 16:
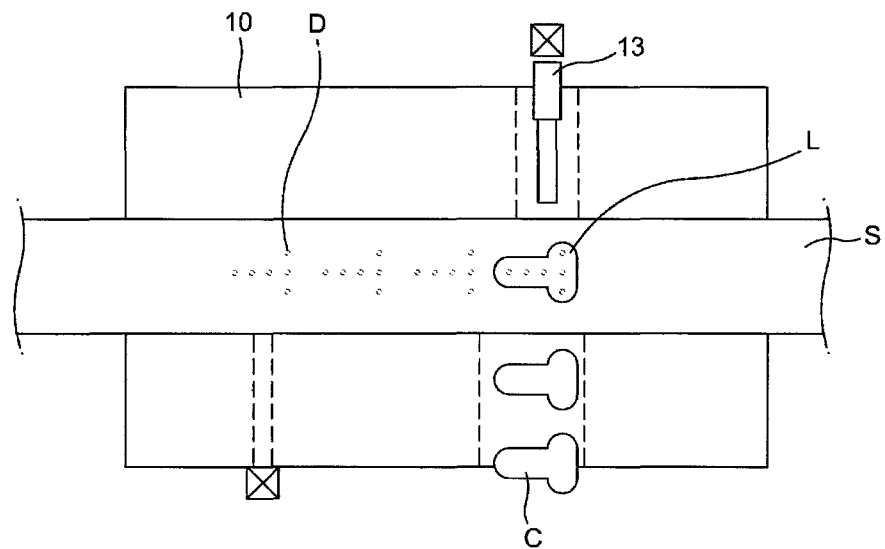
FIG. 16 is a plan view exemplarily illustrating an adhesive application process and a blanking process by a bonded-type laminated core member manufacturing apparatus in accordance with the present invention.

The adhesive application unit 200 may include a plurality of nozzle bodies 210 installed in parallel, and the nozzle bodies 210 are respectively disposed at adhesive application positions D (with reference to FIG. 16, the adhesive being applied in a dot pattern to a plurality of points of a T-shaped laminar member L).

In this embodiment, the adhesive in the adhesive tank T is distributed at a designated pressure through the adhesive reception room 241 and is simultaneously supplied to the nozzle bodies 210. That is, the adhesive of a designated pressure is uniformly supplied to the nozzle bodies 210 connected to the adhesive reception room 241 in parallel, thus being simultaneously applied to a plurality of points, i.e., a plurality of positions. Further, the adhesive reception rooms 241, more particularly, the inside of the nozzle bodies 210, are filled with the adhesive at a designated pressure and, when the valve plug 221 is opened by the pressure member 230, the adhesive within the nozzle body 210 is pushed to the outside by the pressure applied by the pneumatic device and is applied to the surface of the metal strip S.

The height of the upper end of the nozzle body 210 may coincide with the height of the upper surface of the die frame 10b, and the upper surface of the die frame 10b may become a bottom dead center of the metal strip S. Further, a structure, in which, when the metal strip S descends to the bottom dead center, the metal strip S and the upper end of the nozzle body 210 are spaced apart from each other by a designated interval, facilitates discharge and application of the adhesive.

The pressure member 230 is provided on the upper press die 20 and is configured so as to ascend together with the upper press die 20. In more detail, the pressure member 230 is provided on the upper frame 20a installed above the die frame 10b so as to be spaced apart from the die frame 10b by a designated interval and, in this embodiment, the pressure member 230 ascends integrally with the upper press die 20. Therefore, the upper press die 20 becomes an upper holder to support the pressure member 230, and the die frame 10b of the lower press die 10 becomes a lower holder to support the nozzle body 210. A plurality of nozzle bodies 210 may be disposed in parallel on the die frame 10b so as to coincide with the outline shape of the core member C.

The adhesive applicator, i.e., the nozzle body, 210 is descended each designated cycle by a nozzle elevating device 250 provided on the lower press die 10, particularly the lower holder 10c, for example, an elevating device, such as a cam mechanism or a hydraulic/pneumatic cylinder, thus preventing application of the adhesive to the metal strip S. In more detail, if the laminated core member has a 10-layer structure including 10 laminar members L, the adhesive application process is omitted whenever the metal strip S moves up to 10 pitches and, thereby, adhesion between the laminated core members C is prevented.

For this purpose, the nozzle elevating device 250 descends the nozzle body 210 once whenever the metal strip S moves by designated pitches, thus preventing the valve plug 221 from being pressurized by the metal strip S. In the laminated core members C shown in FIG. 1, a dotted line represents a portion in which interlayer adhesion is executed, and a solid line represents a boundary between the laminated core members C without interlayer adhesion.

Figure 14:
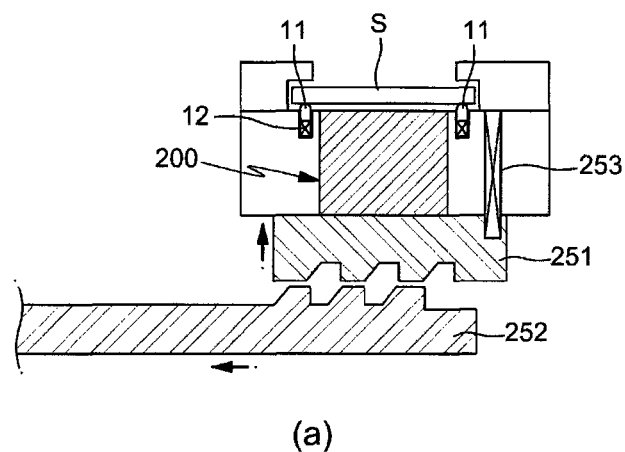
FIG. 14 shows longitudinal-sectional views illustrating a nozzle elevating device for elevating and lowering an adhesive application unit of a bonded-type laminated core member manufacturing apparatus in accordance with one embodiment of the present invention.
Figure 14:
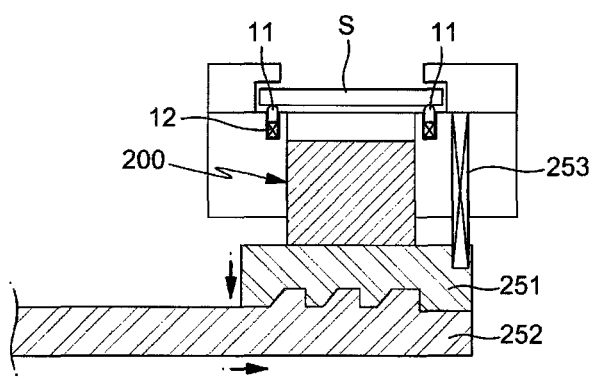

With reference to FIG. 14, the nozzle elevating device 250 in accordance with this embodiment includes an elevating body 251 which supports the adhesive application unit 200, particularly the adhesive applicator, and is provided within the lower frame 10 so as to be elevatable, and a supporter 252 which supports the elevating body 251 and raises the elevating body 251 to the top dead center of the elevating body 251.

In this embodiment, the elevating body 251 is fixed to the lower part of the adhesive application unit 200 and moves integrally with the adhesive application unit 200, particularly the adhesive applicator. Further, the nozzle elevating device 250 further includes a descender 253 which descends the elevating body 251 so as to return elevating body 251 to the bottom dead center of the elevating body 251. Of course, the structure and operating method of the nozzle elevating device 250 are not limited thereto.

Further, in this embodiment, the lower press die 10 includes a base frame 10a forming the base part of the lower press die 10 and a die provided on the base frame 10a, and the nozzle body 210, i.e., the adhesive applicator, is installed in the die.

The die is divided into the die frame 10b in which the nozzle body 210 is installed, and the die holder 10c provided under the die frame 10b, the nozzle elevating device 250 being installed in the die holder 10c. Nozzle installation holes are formed through the die frame 10b but the structure of the lower press die 10, particularly the die frame 10b, is not limited thereto. Further, the nozzle body 210 and the blank die 320 are provided on the die frame 10b, and the pressure member 230 and the blank punch 310 are provided on the upper frame 20a.

Therefore, the adhesive application unit 200 in accordance with this embodiment includes the lower press die 10, the adhesive applicators 210 provided in the lower press die 10, more particularly the die frame 10b, the valves 220 provided in the adhesive applicators 210 to open and close the adhesive applicators 210, the upper press die 20 provided above the lower press die 10, and the pressure member 230 provided on the upper press die 20, more particularly the upper frame 20a.

The adhesive applicator 210, i.e., the nozzle body, the valve plug 221 and the valve supporter 222 may be manufactured of a material which prevents or minimizes adhesion of the adhesive thereto, that is, a plastic formed of a resin having no polarity or low surface tension, in detail, Teflon, or a material to which the adhesive is scarcely adhered, such as polypropylene (PP) or polyethylene (PE).

In this embodiment, the pressure member 230 is a compressed plate or a pressure plate which functions as a stripper in the blanking process and simultaneously pressurizes the metal strip S toward the nozzle bodies 210 in the adhesive application process, and elastic members (for example, coil springs 231) and elevating guides 232 to guide elevation of the pressure member 230 are provided between the pressure member 230 and the upper frame 20a.

Hereinafter, operation of the adhesive application unit 200 in accordance with this embodiment will be described with reference to FIG. 13.

The metal strip S moves to a designated distance each designated cycle, i.e., per press stroke, and passes through a space between the pressure member 230 and the die frame 10b, and, when the metal strip S reaches the adhesive application position, as exemplarily shown in (a) of FIG. 13, the upper press die 20 descends and pressurizes the metal strip S, as exemplarily shown in (b) of FIG. 13. Thereby, the metal strip S pressurizes the valve plugs 221 and thus opens the nozzle outlets 212, and the adhesive in the nozzle bodies 210 is pushed to the outside by internal pressure and is applied to the surface of the metal strip S.

Then, when the upper press die 20 ascends, the metal strip S becomes distant from the nozzle outlets 212 by lifter pins 11 and lifter springs 12, and the valve plugs 221 are raised and again close the nozzle outlets 212, as exemplarily shown in (a) of FIG. 13.

Figure 15:
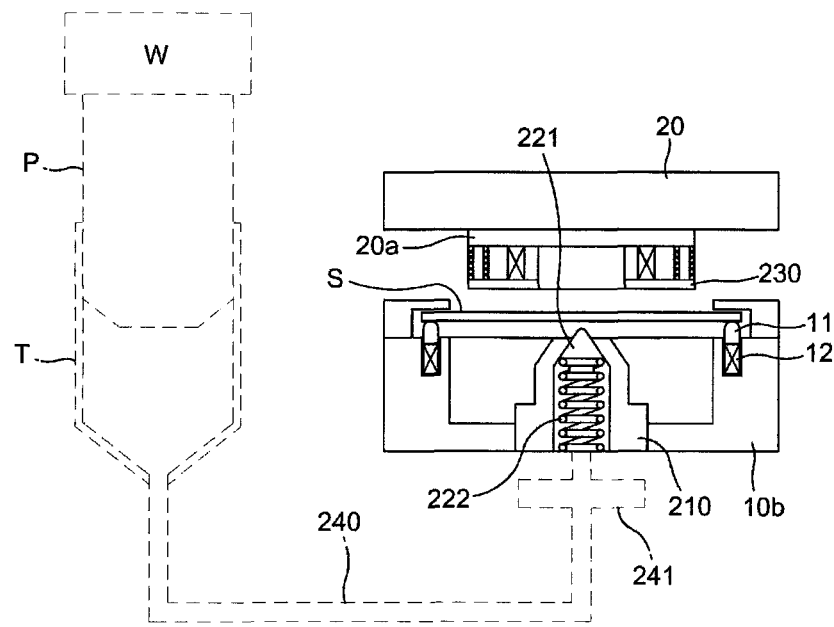
FIG. 15 is a view illustrating an adhesive application unit of a bonded-type laminated core member manufacturing apparatus in accordance with another embodiment of the present invention.

However, a syringe-type adhesive supplier may be used, as exemplarily shown in FIG. 15, so that the adhesive fills the nozzle body 210 by gravity rather than pneumatic pressure or hydraulic pressure. That is, the adhesive supplier may include an adhesive tank T, a piston P, and a weight W. In more detail, the piston P, which is provided in the adhesive tank T, is lowered by the weight W and thus supplies the adhesive within the adhesive tank K to the nozzle body 210. That is, the weight W is lowered due to gravity and causes the piston P to enter the adhesive tank T.

Hereinafter, a process of manufacturing a bonded-type laminated core member by the above-described laminated core member manufacturing apparatus will be described.

When the metal strip S is supplied by a material transfer device (not shown), such as a transfer roller, so that the metal strip S passes through a space between the pressure member 230, i.e., a stripper, and the die frame 10b while moving by 1 pitch, the pressure member 230 and the blank punch 310 mounted on the upper press die 20 are lowered integrally with the upper press die 20 and thus pressurize the upper surface of the metal strip S.

Here, the metal strip S is pressurized by the pressure member 230 and is thus lowered towards the nozzle body 210, and the valve plug 221 is pressurized by the metal strip S and thus opens the outlets of the nozzle bodies 210. Thereby, the adhesive is applied to portions of the surface of the metal strip S, which is located just above the adhesive applicators, i.e., the nozzle bodies 210.

Simultaneously with the above-described adhesive application process, blanking of the metal strip S by the blank punch 310 lowered simultaneously with the pressure member 230 is carried out at a downstream region, as compared to the adhesive applied region, and integration of laminar members L sequentially laminated by blanking is carried out within the laminating hole 100, i.e., the laminating barrel.

The laminating barrel 100a is a passage formed by the above-described squeezer 140, adhesive hardener 110 and pincher 120 and, in such a laminating barrel 100a, lamination of the laminar members L and hardening of the adhesive are carried out.

The squeezer 140 and the pincher 120 align products passing through the laminating barrel 100a, i.e., the laminar members C and laminated core members C, and the adhesive hardener 110 hardens the adhesive interposed between the laminar members L using heat generated by high-frequency induction.

When application of the adhesive and blanking of the metal strip S are completed, the upper press die 20 is elevated, the metal strip S is separated from the valve plugs 221 by the lifter pins 11 and the lifter springs 12, and the nozzle outlets 212 are closed again. Thereafter, when the metal strip S moves again by 1 pitch, the above-described process is repeated and thus manufacture of a bonded-type laminated core member C is carried out.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Therefore, it should be understood by those skilled in the art that these embodiments are given by way of illustration only and the present invention is not limited thereto, and that various modifications, variations, and alterations can be made by those skilled in the art without departing from the spirit and scope of the present invention. Therefore, the scope of the invention should be limited only by the accompanying claims and equivalents thereof.

INDUSTRIAL APPLICABILITY

As apparent from the above description, the present invention relates to a core manufacturing apparatus, which manufactures a core used as a rotor or stator of a motor or a generator, and a process of manufacturing a core using the same, and may facilitate alignment and lamination of thin plates forming the core and rapidly and easily integrate the thin plates.

What is claimed is:

1. A bonded-type laminated core member manufacturing apparatus comprising:
    an adhesive application unit configured to apply an adhesive to a material being continuously transferred;
    a blanking unit configured to sequentially form laminar members by blanking the material; and
    a laminating unit configured to integrate the laminar members, laminated within a laminating hole by blanking the material, into a laminated core member,
    wherein the laminating unit includes:
        an adhesive hardener configured to harden the adhesive located between the laminar members so as to integrate the laminar members passing through the laminating hole, the adhesive hardener being configured to apply heat to harden the adhesive;
        a squeezer coaxially disposed between the blanking unit and the adhesive hardener, the squeezer being configured to squeeze the laminar members received from the blanking unit by applying a lateral pressure thereto so as to align the laminar members before moving the laminar members into the adhesive hardener;
        a pincher provided under the adhesive hardener to apply a lateral pressure to the laminated core member so as to prevent falling of the laminated core member;
        a first blocking member disposed between the squeezer and the adhesive hardener and configured to thermally isolate the squeezer from the adhesive hardener; and
        a second blocking member disposed between the pincher and the adhesive hardener and configured to thermally isolate the pincher from the adhesive hardener.

2. The bonded-type laminated core member manufacturing apparatus according to claim 1, wherein the pincher includes a plurality of pinching blocks movably provided under the adhesive hardener so as to pressurize a side surface of the laminated core member, and elastic members configured to elastically support the pinching blocks toward the side surface of the laminated core member.

3. The bonded-type laminated core member manufacturing apparatus according to claim 2, wherein the pinching blocks are spaced apart from each other within the laminating hole.

4. The bonded-type laminated core member manufacturing apparatus according to claim 1, wherein the laminating unit further includes cooling paths enclosing the adhesive hardener.

5. The bonded-type laminated core member manufacturing apparatus according to claim 4, wherein the laminating unit further includes additional cooling paths disposed between the first blocking member and the adhesive hardener.

6. The bonded-type laminated core member manufacturing apparatus according to claim 4, wherein the cooling paths are formed in a cooling block and the adhesive hardener is disposed within the cooling block.

7. The bonded-type laminated core member manufacturing apparatus according to claim 6, wherein an outer surface of the adhesive hardener is surrounded by the cooling block.

8. The bonded-type laminated core member manufacturing apparatus according to claim 1, wherein the blanking unit is provided above the laminating unit,
    wherein the blanking unit includes:
        a blank punch provided on an upper press die of the bonded-type laminated core member manufacturing apparatus; and
        a blank die provided on a lower press die of the bonded-type laminated core member manufacturing apparatus, together with the laminating unit, so as to be opposite to the blank punch, and
    wherein the adhesive application unit includes an adhesive applicator provided on the lower press die together with the blank die,
        a pressure member to pressurize the material toward the adhesive applicator is provided on the upper press die, and
        the adhesive applicator is provided at an upstream region in a transfer direction of the material, as compared to the blank die.

9. The bonded-type laminated core member manufacturing apparatus according to claim 1, wherein the laminating unit further includes a guide provided within the laminating hole so as to guide movement of the laminar members, and
    wherein a gap is formed between an outer surface of the guide and an inner circumferential surface of the adhesive hardener.

10. The bonded-type laminated core member manufacturing apparatus according to claim 9, wherein the guide is formed separate from the squeezer.

11. The bonded-type laminated core member manufacturing apparatus according to claim 1, wherein the blanking unit includes:
    a blank punch provided on an upper press die of the bonded-type laminated core member manufacturing apparatus; and
    a blank die provided on a lower press die of the bonded-type laminated core member manufacturing apparatus, together with the laminating unit, so as to be opposite to the blank punch, and
    wherein the blank die is disposed above the squeezer.

12. The bonded-type laminated core member manufacturing apparatus according to claim 1, wherein the squeezer extends horizontally between the blanking unit and the adhesive hardener.

13. The bonded-type laminated core member manufacturing apparatus according to claim 1, wherein the squeezer is disposed below the blanking unit and above the first blocking member.

14. The bonded-type laminated core member manufacturing apparatus according to claim 1, wherein the first blocking member is disposed below the squeezer and above the adhesive hardener.

15. An apparatus comprising:
a blanking unit, configured to sequentially form laminar members;
a laminating unit, provided under the blanking unit, configured to integrate the laminar members, laminated in a vertical direction within a laminating hole, so as to manufacture a laminated core member, the laminating unit comprising:
an adhesive hardener configured to harden an adhesive located between the laminar members so as to integrate the laminar members passing through the laminating hole, the adhesive hardener being configured to apply heat to harden the adhesive;
a squeezer coaxially disposed between the blanking unit and the adhesive hardener, the squeezer being configured to squeeze the laminar members received from the blanking unit by applying a lateral pressure thereto so as to align the laminar members before moving the laminar members into the adhesive hardener;
a pincher provided under the adhesive hardener to apply a lateral pressure to a laminated core member so as to prevent falling of the laminated core member;
a first blocking member disposed between the squeezer and the adhesive hardener and configured to thermally isolate the squeezer from the adhesive hardener; and
a second blocking member disposed between the pincher and the adhesive hardener and configured to thermally isolate the pincher from the adhesive hardener.

* * * * *